US007726662B2

(12) United States Patent
Foster (10) Patent No.: US 7,726,662 B2
(45) Date of Patent: Jun. 1, 2010

(54) STOPPED-ACTIVE TYPE CYLINDER HEAD GASKET

(75) Inventor: Jeffery A. Foster, North Aurora, IL (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 453 days.

(21) Appl. No.: 11/483,930

(22) Filed: Jul. 10, 2006

(65) Prior Publication Data

US 2008/0007014 A1   Jan. 10, 2008

(51) Int. Cl.
  *F02F 11/00*  (2006.01)
(52) U.S. Cl. ................... 277/592; 277/593; 277/595
(58) Field of Classification Search ......... 277/592–595, 277/600, 601
  See application file for complete search history.

(56) References Cited

U.S. PATENT DOCUMENTS

| 3,519,281 | A | * | 7/1970 | Teucher et. al. | 277/601 |
|---|---|---|---|---|---|
| 4,285,527 | A | * | 8/1981 | Connely | 277/595 |
| 4,468,044 | A | * | 8/1984 | Ulmer et al. | 277/596 |
| 5,087,058 | A | | 2/1992 | Miura et al. | |
| 5,169,163 | A | * | 12/1992 | Udagawa et al. | 277/593 |
| 5,201,534 | A | * | 4/1993 | Miyaoh | 277/595 |
| 5,277,433 | A | * | 1/1994 | Ishikawa et al. | 277/593 |
| 5,277,434 | A | | 1/1994 | Kestly et al. | |
| 5,435,575 | A | * | 7/1995 | Udagawa | 277/592 |
| 5,505,466 | A | * | 4/1996 | Willis et al. | 277/601 |
| 5,775,701 | A | * | 7/1998 | Martini | 277/591 |
| 5,873,577 | A | * | 2/1999 | Inamura | 277/594 |
| 6,076,833 | A | * | 6/2000 | Geshi | 277/595 |
| 6,131,915 | A | | 10/2000 | Nicholson | |
| 6,168,167 | B1 | | 1/2001 | Aoki | |
| 6,315,303 | B1 | * | 11/2001 | Erb et al. | 277/593 |
| 6,371,489 | B1 | * | 4/2002 | Combet et al. | 277/594 |
| 6,422,572 | B1 | | 7/2002 | Ueda et al. | |
| 6,439,579 | B2 | * | 8/2002 | Uemura et al. | 277/595 |
| 6,478,302 | B1 | * | 11/2002 | Nakamura | 277/317 |
| 6,719,301 | B2 | * | 4/2004 | Chen et al. | 277/601 |
| 6,851,677 | B2 | * | 2/2005 | Miyaoh et al. | 277/594 |
| 2001/0006279 | A1 | * | 7/2001 | Sugimoto et al. | 277/595 |
| 2003/0085530 | A1 | * | 5/2003 | Miyaoh et al. | 277/593 |
| 2003/0168818 | A1 | * | 9/2003 | Pepin | 277/593 |
| 2007/0290452 | A1 | * | 12/2007 | Matsushita et al. | 277/595 |
| 2008/0197580 | A1 | * | 8/2008 | Imai | 277/595 |

* cited by examiner

*Primary Examiner*—Alison K Pickard
(74) *Attorney, Agent, or Firm*—Marshall & Melhorn LLC (57) ABSTRACT

An embodiment provides a MLS gasket that includes a metal body portion having an external periphery, an upper body surface generally defining a first plane. At least one cylinder aperture formed in the metal body portion and defined by an inner aperture surface. The gasket also includes a combustion seal insert including a first insert layer having an outer first periphery, a top first insert surface and a bottom first insert surface. The outer first periphery is circumscribed by the inner aperture surface. The first insert layer includes a first insert bead portion. The gasket further includes a first sealing layer having a top first sealing surface and a bottom first sealing surface. Portions of the bottom first sealing surface are selectively in contact with each of the upper body surface and the top first insert surface. Compression of the first insert bead portion is selectively limited by the body portion.

8 Claims, 7 Drawing Sheets

STOPPED-ACTIVE TYPE CYLINDER HEAD GASKET

TECHNICAL FIELD

The technical field is related generally to multi layer steel (MLS) gaskets, and more particularly to compression limiters for MLS gaskets and methods of forming a compression limiter in a MLS gasket.

BACKGROUND

In recent years, MLS cylinder head gaskets for internal combustion engines have become a preferred choice with at least two gasket layers formed from steel. In a typical MLS gasket, the layers are formed with a plurality of openings. More specifically, typical gaskets include cylinder bore openings, coolant openings, bolt holes and oil holes. Typically, the gasket includes full beads around the cylinder bore openings and half beads that surround the non-cylinder bore openings and the outer periphery of the gasket. The bolt holes, which are generally located around the periphery of the gasket, cooperate with bolts to secure the gasket between the cylinder head and engine block. The cylinder bore openings, coolant holes and oil holes are sealed by surface pressures formed by the clamping action of the bolts to deform the half or full beads, thereby creating a sealing pressure between the portions of the cylinder head and engine block that are in contact with the gasket.

Generally, when the bolts are tightened, the surface pressure between portions of the cylinder head and engine block that are in contact with the gasket varies somewhat throughout the sealing joint. Since the seal around the cylinder bore openings is generally a primary concern in head gasket manufacture, other sealing portions, usually half beads, of the gasket must accommodate this priority of design. During engine operation, the high pressures and temperatures, and the operating conditions at the head gasket location cause movement between the cylinder head and the cylinder block. This movement causes variation in sealing pressures and may cause the full beads or half beads to compress until bead portions contact a surface that inhibits further compression. This variation in sealing pressure is especially prevalent in the full beads surrounding the cylinder bore openings.

In practice, no cylinder head and cylinder block mating surfaces are perfectly planar or perfectly parallel. Gaps between the cylinder head and cylinder block exist if an engine were to be assembled without a gasket interposed therebetween. With a gasket installed between the cylinder head and cylinder block, areas of localized stress are created when fasteners (not shown) such as a bolt are positioned through bolt holes, and then tightened to secure the cylinder head and cylinder block. These gaps result in unequal sealing stresses around the bolt holes, the cylinder bore openings, and other portions of the gasket. Furthermore, the gasket will be subject to high loads in compression during engine operation. This high compression loading generates higher stresses that may result in an undesirable reduction in recovery capability and/or characteristics of the gasket, such as cracking of bead portions or plastic deformation of bead portions.

Figure 1:
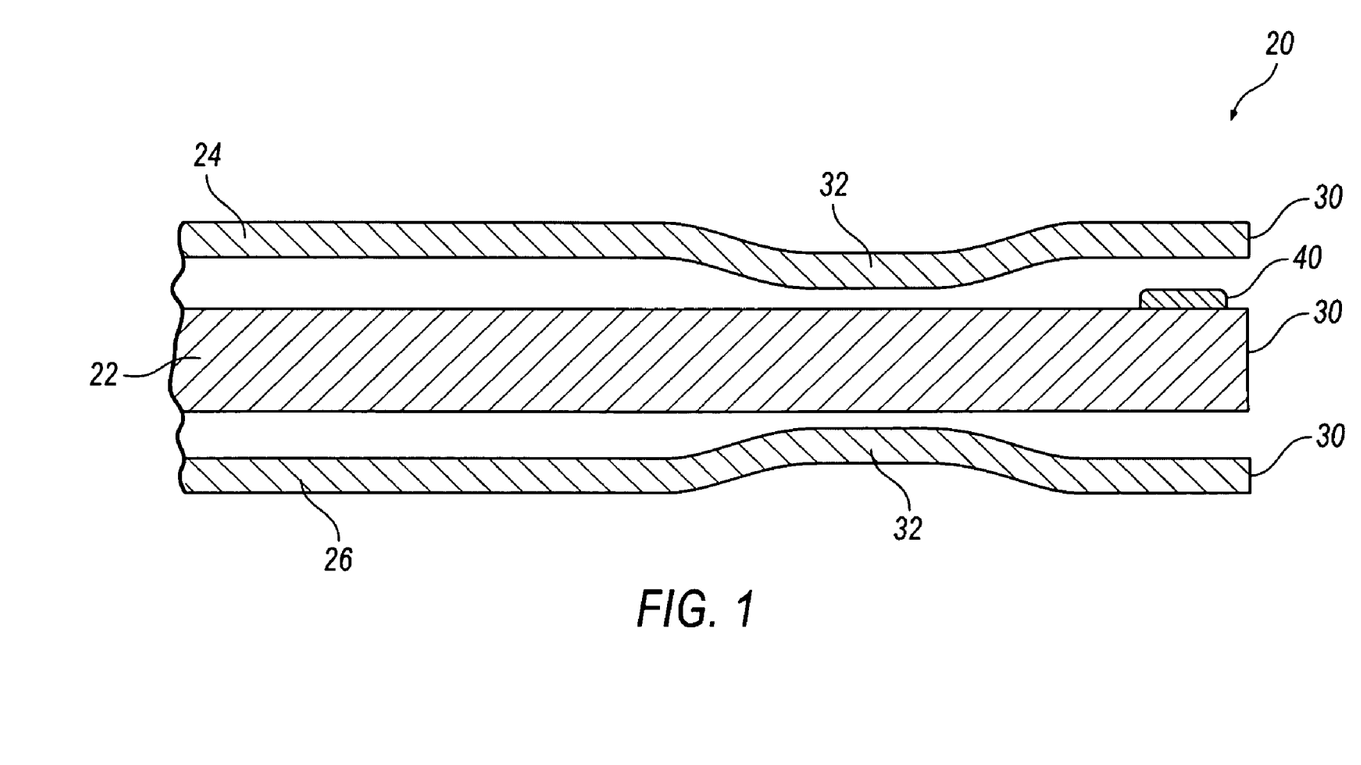
FIG. 1 is an enlarged partial sectional view of a fragmentary portion of a gasket.

FIG. 1 illustrates a portion of a MLS gasket 20. Gasket 20 has a body, or base layer 22, a top layer 24, and a bottom layer 26. A cylinder aperture 30 is formed in the layers 22, 24, 26. Both the top layer 24 and the bottom layer 26 have a bead 32 formed therein that circumscribes the cylinder aperture 30. Base layer 22 further include an embossed edge stopper 40 formed thereon. The beads 32 and the embossed edge stopper 40 circumscribe the cylinder aperture 30 to exert a sealing pressure around the cylinder aperture 30 and between a cylinder head (not shown) and an engine block (not shown).

In operation, the gasket 20 introduces stresses into an engine, in part, due to the edge stopper 40 impacting the top layer 24 adjacent bead 32 during relative vertical motion between the cylinder head and engine block. Specifically, the location of the edge stopper adjacent the cylinder aperture 30 results in distortion of both the cylinder head and engine block, especially when aluminum is utilized. Undesirable distortion of the cylinder bore may effect engine performance and ring sealing capability. Significant stresses are encountered where the valve seats formed within an aluminum cylinder head are distorted. Since steel valve seats are often inserted within aluminum cylinder heads, the coupling between the valve seats and the cylinder head may be undesirably degraded due to the additional stresses introduced by a stopper such as the edge stopper 40. Also, embossments such as the edge stopper 40 may be damaged, or flattened in portions during severe or normal operations, which may lead to premature bead failure since the embossments may no longer protect the beads from undesirable full compression.

Additionally, all layers of a MLS gasket are typically coated stainless steel. The coatings on the gasket layers are used to improve gasket performance and are typically more difficult and costly to apply to a stainless steel as compared to a carbon steel.

Evaluations have been performed on gaskets that have experienced an undesirable reduction in recovery capability and/or characteristics at portions, such as the sealing beads surrounding cylinder apertures in gaskets that are interposed between a cylinder head and a cylinder block of an internal combustion engine (not shown). In many gaskets evaluated, the undesirable reduction in recovery capability and/or characteristics of bead portions were greater with edge stoppers. Accordingly, there is a need to provide a sealing mechanism that eliminates edge stoppers and may permit beads to be formed of a material with a greater stiffness than is permitted with an optimized edge stopper type gasket. A favorable gasket may also reduce the costs and difficulty associated with coating the surface area of all gasket layers.

SUMMARY

An embodiment provides a MLS gasket that includes a metal body portion having an external periphery, an upper body surface, and a lower body surface. The upper body surface and the lower body surface generally define a body thickness of the metal body portion therebetween. The gasket also includes at least one cylinder aperture formed in the metal body portion and defined by an inner aperture surface. The gasket additionally includes a combustion seal insert including a first insert layer having an outer first periphery, a top first insert surface and a bottom first insert surface. The outer first periphery is circumscribed by the inner aperture surface, and the first insert layer includes a first insert bead portion. The gasket further includes a first sealing layer having a top first sealing surface and a bottom first sealing surface. Portions of the bottom first sealing surface are selectively in contact with each of the upper body surface and the top first insert surface. Compression of the first insert bead portion is selectively limited by the body portion.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description. Specifically, the illustration planes and the use of the term 'plane' herein is intended to encompass generally planar portions of the gasket layer bodies and surfaces. While portions of the gasket layer bodies and surfaces may not be perfectly planar, and bead portions of layers (if any) are generally not planar, portions of the bead portions, and the remainder of the gasket, may generally define a plane, as described herein.

DETAILED DESCRIPTION

Figure 2:
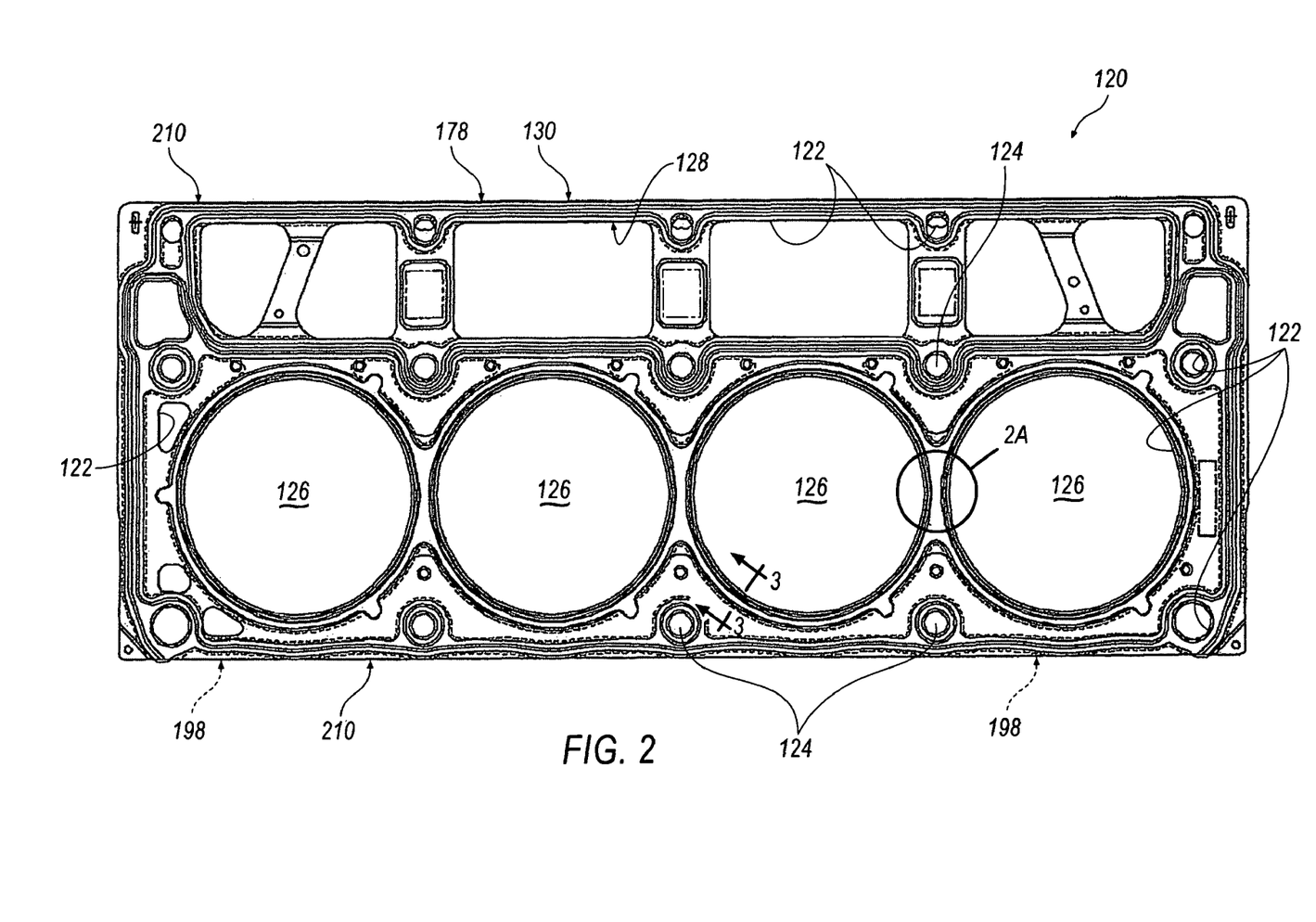
FIG. 2 is a plan view of an MLS cylinder head gasket, according to an embodiment, with surface graphics applied to raised portions.
Figure 2A:
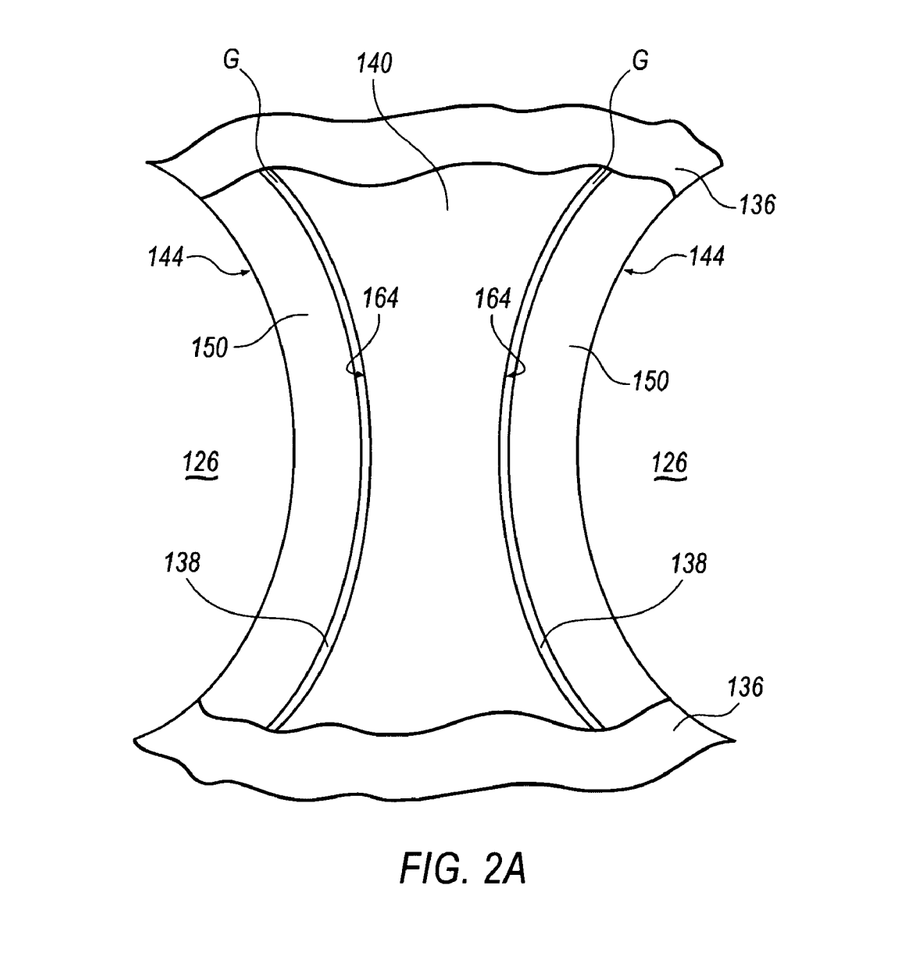
FIG. 2A is an enlarged partial cut away view of encircled portion 2A of FIG. 2, with details of bead portions omitted for clarity.

FIG. 2 illustrates an embodiment of a MLS gasket 120. The gasket 120 is defined in part by a plurality of apertures 122 such as bolt holes 124, cylinder bore openings 126, that are aligned with corresponding apertures of a cylinder head (not shown) and cylinder block (not shown) of an engine, and oil holes 128. The gasket 120 is further defined by an outer periphery 130. When an engine is fully assembled, the gasket 120 is positioned between a cylinder head and a cylinder block to fill gaps and seal around the apertures 122, and bolts (not shown) are tightened within the bolt holes 124 to compress the gasket 120, as discussed below. The seal generated by gasket 120 serves to prevent leaks between apertures 122, and at the outer periphery 130 of the gasket 120.

Figure 3:
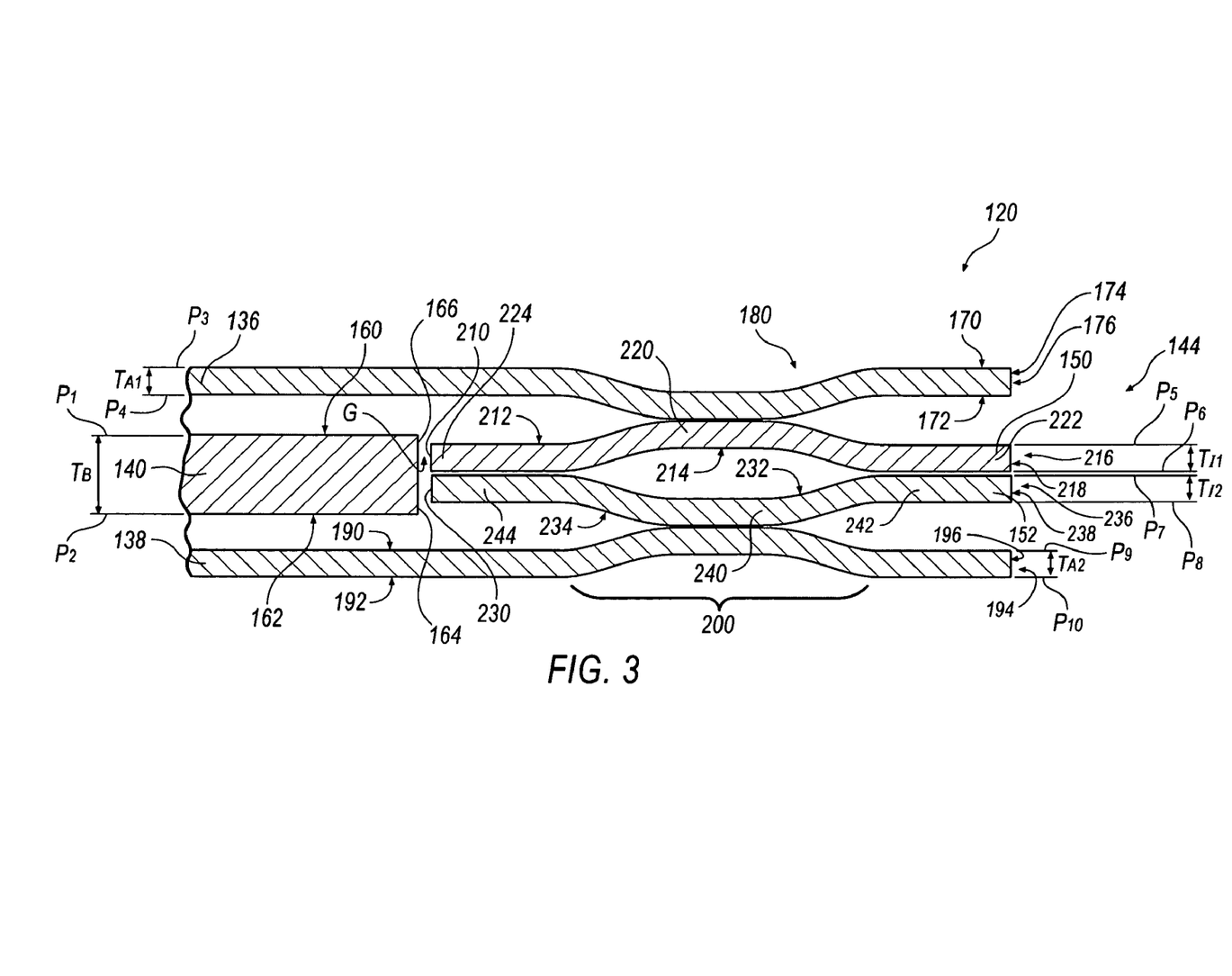
FIG. 3 is an enlarged partial sectional view taken along line 3-3 of FIG. 2.

As best seen in FIG. 3, the gasket 120 is a multi-layered gasket having at least a first sealing layer, or first metal layer, 136, a second sealing layer, or second metal layer, 138, a gasket body portion, or a body portion 140, and an insert assembly 144. In the embodiment illustrated, the insert assembly 144 includes a first insert portion 150 and a second insert portion 152. The body portion 140 is a relatively thick metal layer, compared to layers 136, 138. The body portion 140 is interposed between the first metal layer 136 and the second metal layer 138. First and second metal layers 136, 138 are relatively thin in comparison with body portion 140 and are preferably constructed of 301 stainless steel, a relatively robust metal with a high spring rate and stiffness for meeting desired performance requirements over a useful gasket life, such as recovery. The body portion 140 is preferably formed of a less robust metal, such as 409 stainless steel, or in some cases even zinc-plated or non-plated low carbon steels. Each of the metal layers 136, 138, 140 include corresponding apertures 122 formed therein such that all of the holes and openings of each metal layer 136, 138, 140 align when assembled into gasket 120, as best seen in FIG. 2.

The body portion 140 is defined by a upper body surface 160 generally defining a first plane P1, a lower body surface 162 generally defining a second plane P2, and an inner body aperture surface 164 defining a cylinder aperture 166. A body thickness TB is generally defined by the distance between planes P1 and P2.

The first metal layer 136 includes a top first sealing surface 170 generally defining a plane P3, a bottom first sealing surface 172 generally defining a plane P4, a first internal sealing aperture 174 defined by a first internal aperture surface 176, a first external periphery 178 (FIG. 2), and a first bead portion 180. The first metal layer 136 has a maximum thickness of TA1 measured generally between plane P3 and plane P4.

The second metal layer 138 includes a top second sealing surface 190 generally defining a plane P5, a bottom second sealing surface 192 generally defining a plane P6, a second internal sealing aperture 194 defined by a second internal aperture surface 196, a second external periphery 198 (FIG. 2), and a second bead portion 200. The second metal layer 138 has a maximum thickness of TA2 measured generally between plane P5 and plane P6.

The first insert portion 150 includes an outer first periphery 210, a top first insert surface 212 generally defining a plane P7, a bottom first insert surface 214 generally defining a plane P8, a first internal insert aperture 216 defined by a first internal insert surface 218, and a first insert bead portion 220 separating a first insert inner edge 222 and a first insert outer edge 224. The first insert portion 150 has a maximum thickness of TI1 measured generally between plane P7 and plane P8.

The second insert portion 152 includes an outer second periphery 230, a top second insert surface 232 generally defining a plane P9, a bottom second insert surface 234 generally defining a plane P10, a second internal insert aperture 236 defined by a second internal insert surface 238, and a second insert bead portion 240 separating a second insert inner edge 242 and a second insert outer edge 244. The second insert portion 152 has a maximum thickness of TI2 measured generally between plane P9 and plane P10.

In one embodiment, the first metal layer 136, second metal layer 138, body portion 140, first insert portion 150, and second insert portion 152 each have a substantially constant thickness.

The first insert inner edge 222 and first insert outer edge 224 of first insert portion 150 are generally defined by plane P5 and plane P6, while the top first insert surface 212 and the bottom first insert surface 214 of bead portion 220 are generally not coplanar with either plane P5 or plane P6. That is, the top first insert surface 212 of bead portion 220 is not co-planar with, and may not be parallel to, plane P5, and the bottom first insert surface 214 of first insert bead portion 220 is not co-planar with, and may not be parallel to, plane P6. As will be appreciated, portions of top first insert surface 212 and the bottom first insert surface 214 of bead portion 220 may be parallel with and/or coplanar to planes P5 and P6 during operation or installation of gasket 120.

Bead portions 180, 200, 220, and 240 circumscribe the cylinder aperture 126 and are preferably constructed of a stiffer material than the body portion 140. Also, bead portions 180, 200, 220, and 240 are generally axially aligned perpendicular to plane P1.

As illustrated, the peripheries 210, 230 are circumscribed by cylinder aperture 166 with a gap G therebetween, although no discernable gap G may exist between the peripheries 210, 230 and cylinder aperture 166. Also as illustrated, portions of bottom first sealing surface 172 of the first bead portion 180 are selectively in contact top first insert surface 212.

In one embodiment, the combined thicknesses of first insert layer thickness TI1 and second insert layer thickness TI2 is less than the body thickness TB. FIG. 3 illustrates the gasket 120 in an uninstalled state, before the gasket 120 is positioned between a cylinder head (not shown) and an engine block (not shown). Preferably, when the gasket 120 is installed between the cylinder head and engine block, the upper body surface 160 of the body portion 140 is generally in full contact with the bottom first sealing surface 172 of the first metal layer 136, and the lower body surface 162 of the body portion 140 is generally in full contact with the top second sealing surface 190 of the second metal layer 138.

In operation, the thickness TB of the body portion 140 prevents full compression of the first insert bead portion 220 and the second insert bead portion 240, since the thickness TB is greater than the combination of thicknesses TI1 and TI2. Furthermore, the body portion 140 is not susceptible to flattening in undesirable portions as are embossments, such as the edge stopper 40 (shown in FIG. 1), since the body portion 140 provides a greater surface area of contact to resist flattening and damage. Therefore, the body portion 140 retains the insert assemblies 144 while providing a stopper for the insert assemblies 144.

While the first metal layer 136, second metal layer 138, first insert portion 150, and second insert portion 152 are each illustrated with a single full bead 180, 200, 220, 240, any number of beads, including half beads, may be stacked in order to provide a desired seal for cylinder apertures 126.

Figure 4:
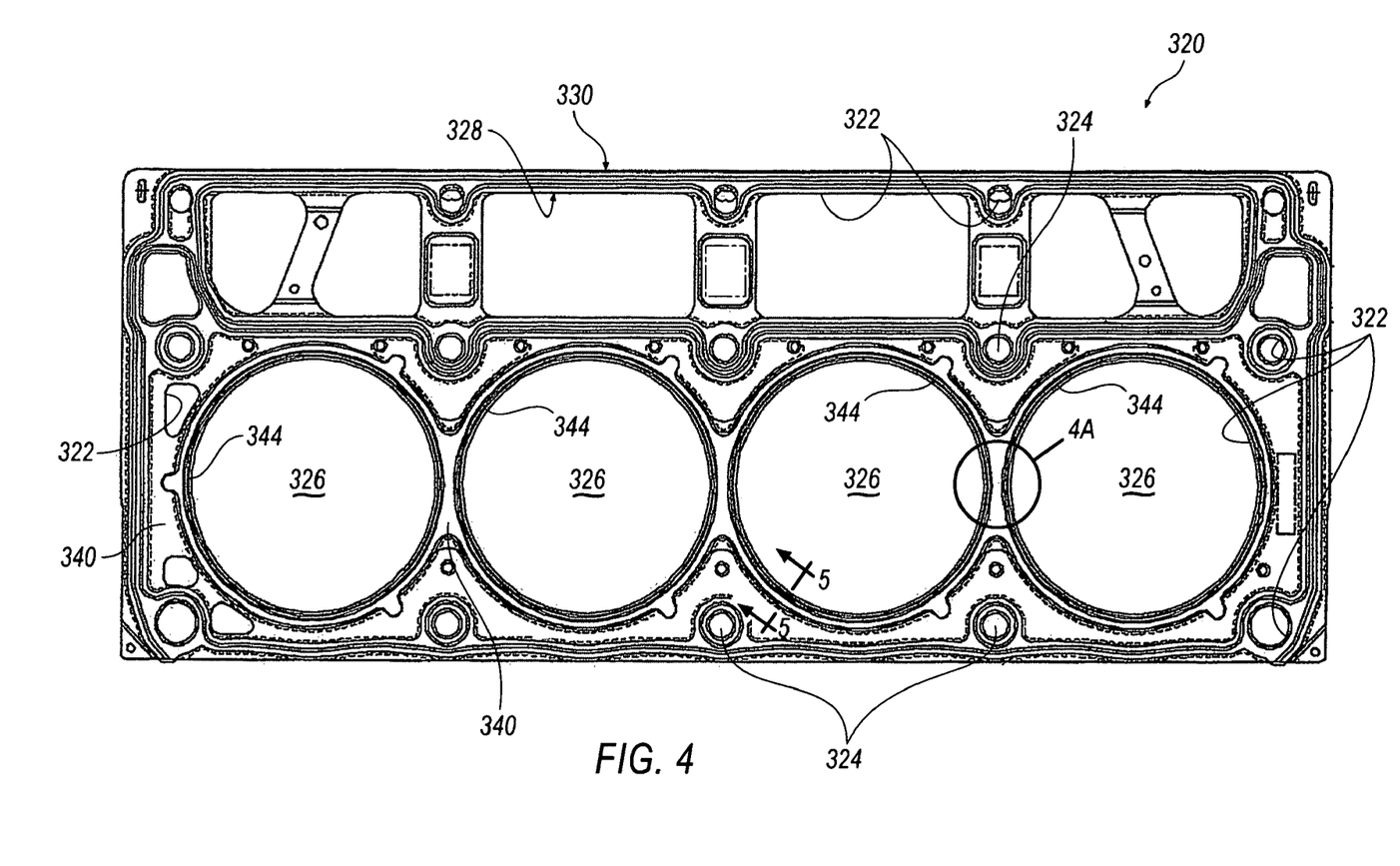
FIG. 4 is a plan view of an MLS cylinder head gasket, according to an embodiment, with surface graphics applied to raised portions.

FIG. 4 illustrates an alternative embodiment of the gasket 120 as a gasket 320. The gasket 320 is defined in part by a plurality of apertures 322 such as bolt holes 324, cylinder bore openings 326, that are aligned with corresponding apertures of a cylinder head CH and cylinder block CB of an engine, and oil holes 328. The gasket 320 is further defined by an outer periphery 330. When the engine is fully assembled, the gasket 320 is positioned between the cylinder head CH and cylinder block CB (FIG. 5) to fill gaps and seal around the apertures 322, and bolts (not shown) are tightened within the bolt holes 324 to compress the gasket 320, as discussed below. The seal generated by gasket 320 serves to prevent leaks between apertures 322, and at the outer periphery 330 of the gasket 320.

Figure 4A:
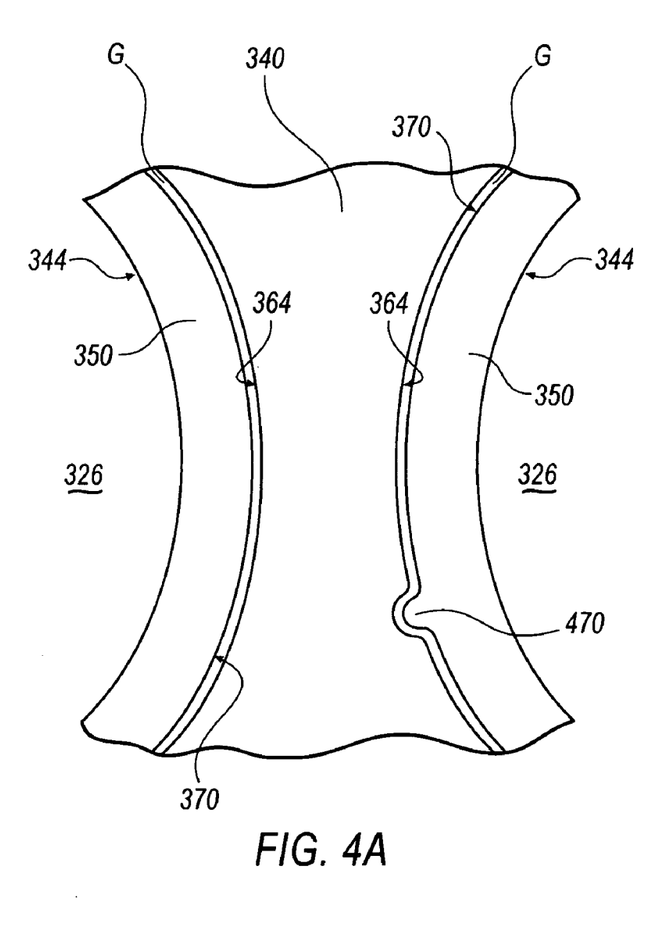
FIG. 4A is an enlarged view of encircled portion 4A of FIG. 4, with details of bead portions omitted for clarity.
Figure 5:
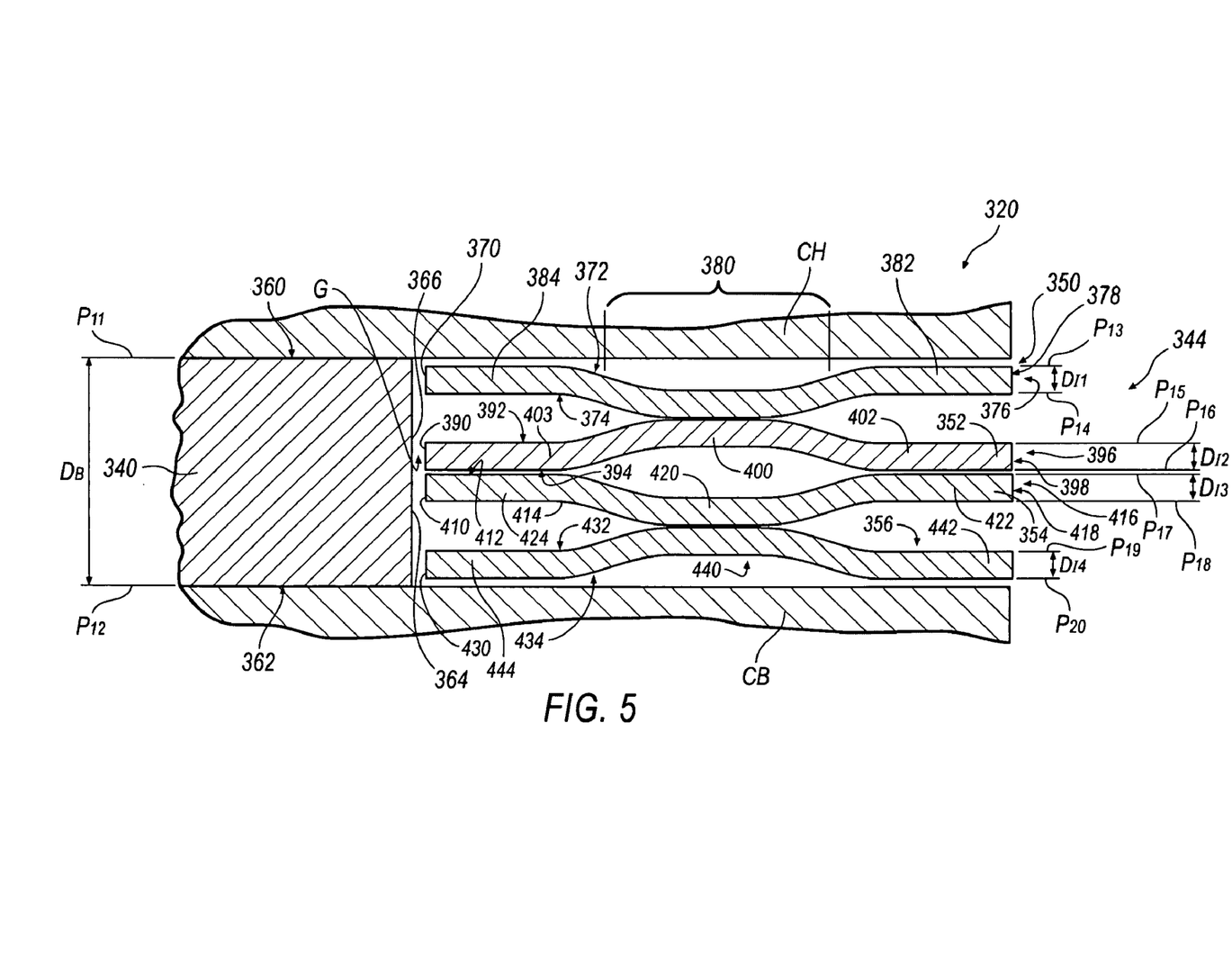
FIG. 5 is an enlarged partial sectional view taken along line 5-5 of FIG. 4, with layers separated for clarity.

As best seen in FIGS. 4, 4A and 5, the gasket 320 is a multi-layered gasket having a gasket body portion, or a body portion 340, and an insert assembly 344. In the embodiment illustrated in FIG. 5, the insert assembly 344 includes a first insert portion 350, a second insert portion 352, a third insert portion 354, and a fourth insert portion 356. The body portion 340 is a relatively thick metal layer, compared to portions 350, 352, 354, 356. Insert portions 350, 352, 354, 356 are preferably constructed of 301 stainless steel, a relatively robust metal with a high spring rate and stiffness for meeting desired performance requirements over a useful gasket life, such as recovery. The body portion 340 is preferably formed of a less robust metal, such as 409 stainless steel, or in some cases even zinc-plated or non-plated low carbon steels.

The body portion 340 is defined by a upper body surface 360 generally defining a first plane P11, a lower body surface 362 generally defining a second plane P12, and an inner body aperture surface 364 defining a cylinder aperture 366. A body thickness DB is generally defined by the distance between planes P11 and P12.

The first insert portion 350 includes an outer first periphery 370, a top first insert surface 372 generally defining a plane P13, a bottom first insert surface 374 generally defining a plane P14, a first internal insert aperture 376 defined by a first internal insert surface 378, and a first insert bead portion 380 separating a first insert inner edge 382 and a first insert outer edge 384. The first insert portion 350 has a maximum thickness of DI1 measured generally between plane P13 and plane P14.

The second insert portion 352 includes an outer second periphery 390, a top second insert surface 392 generally defining a plane P15, a bottom second insert surface 394 generally defining a plane P16, a second internal insert aperture 396 defined by a second internal insert surface 398, and a second insert bead portion 400 separating a second insert inner edge 402 and a second insert outer edge 404. The second insert portion 352 has a maximum thickness of DI2 measured generally between plane P15 and plane P16.

The third insert portion 354 includes an outer third periphery 410, a top third insert surface 412 generally defining a plane P17, a bottom third insert surface 414 generally defining a plane P18, a third internal insert aperture 416 defined by a third internal insert surface 418, and a third insert bead portion 420 separating a third insert inner edge 422 and a third insert outer edge 424. The third insert portion 354 has a maximum thickness of DI3 measured generally between plane P17 and plane P18.

The fourth insert portion 356 includes an outer fourth periphery 430, a top fourth insert surface 432 generally defining a plane P19, a bottom fourth insert surface 434 generally defining a plane P20, a fourth internal insert aperture 436 defined by a fourth internal insert surface 438, and a fourth insert bead portion 440 separating a fourth insert inner edge 442 and a fourth insert outer edge 444. The fourth insert portion 356 has a maximum thickness of DI4 measured generally between plane P19 and plane P20.

The body portion 340, first insert portion 350, second insert portion 352, third insert portion 354, and fourth insert portion 356 each have a generally constant thickness. As illustrated in FIG. 5, the first insert portion 350, second insert portion 352, third insert portion 354, and fourth insert portion 356 are exploded for clarity, although cylinder block CB, cylinder head CH, first insert portion 350, second insert portion 352, third insert portion 354, and fourth insert portion 356 would desirably contact when the gasket 320 is installed.

The first insert inner edge 382 and first insert outer edge 384 of first insert portion 350 are generally defined by plane P13 and plane P14, while the top first insert surface 372 and the bottom first insert surface 374 of first insert portion 350 are generally not coplanar with either plane P13 or plane P14. That is, the top first insert surface 172 of first insert portion 350 is not co-planar with, and may not be parallel to, plane P13, and the bottom first insert surface 374 of first insert portion 350 is not co-planar with, and may not be parallel to, plane P14.

Insert bead portions 380, 400, 420, and 440 circumscribe the cylinder aperture 326 and are preferably constructed of a stiffer material than the body portion 340. Also, insert bead portions 380, 400, 420, and 440 are generally axially aligned perpendicular to plane P11.

As illustrated in FIGS. 4A and 5, the peripheries 370, 390, 410, 430 are circumscribed by cylinder aperture 366 with a gap G therebetween, although no discernable gap G may exist between the peripheries 370, 390, 410, 430 and cylinder aperture 366. As best seen in FIG. 4A, at least the outer periphery 370 of the first insert portion 350 may further include at least one contoured tab 470. The radial thickness of the first insert portion 350, measured generally parallel to the plane P13, is greater at portions of the first insert portion 350 that include the contoured tab 470 than at portions of the first insert portion 350 that do not include the contoured tab 470. Thus provided, the contoured tab 470 will provide an alignment guide for assembly. Additionally, the contoured tab 470 may be welded to the body portion 340 to retain the insert assembly 344 with the gasket 320 and to prevent misalignment of the body portion 340, the insert assembly 344, and the cylinder head during installation of the gasket 320. One or more contoured tabs 470 may extend from any or all insert portions 350 352, 354, 356.

While the first insert portion 350, second insert portion 352, third insert portion 354, and fourth insert portion 356 are each illustrated with a single full bead 380, 400, 420, 440, any number of beads, including half beads, may be stacked in order to provide a desired seal for cylinder apertures 326.

FIG. 5 illustrates the gasket 320 in an installed state, after the gasket 320 is positioned between a cylinder head CH and an engine block CB. Preferably, when the gasket 320 is installed between the cylinder head and engine block, the upper body surface 360 of the body portion 340 is generally in full contact with the cylinder head CH, and the lower body surface 362 of the body portion 340 is generally in full contact with the engine block CB.

In operation, the thickness DB of the body portion 340 prevents full compression of the first insert bead portion 380 the second insert bead portion 400, third insert bead portion 420 and the fourth insert bead portion 440, since the thickness DB is greater than the combination of thicknesses DI1, DI2, DI3 and DI4. Furthermore, the body portion is not susceptible to flattening in portions as are embossments, such as the edge stopper 40. Therefore, the body portion 340 retains the insert assemblies 344 while providing a stopper for the insert assemblies 344.

Other apertures 122, 322 may have insert assemblies similar insert assemblies 144, 344 sealing therearound. While insert portions 350, 352, 354, 356 are illustrated with a single full bead 380, 400, 420, 440, partial or multiple beads may be provided, as desired.

In an exemplary embodiment, each of insert portions 350, 352, 354, 356 are about 0.0080 inches in thickness and the body portion 340 is about 0.040 inches in body thickness TB.

Additionally, the gasket 320 may allow non-stainless steels to be used for the body portion 340 while stainless steels are used for the insert portion 350, resulting in a cost savings over the gasket 20 which is typically constructed entirely of stainless steels. Preferably, body portions 140, 340 are formed of a high strength low alloy (HSLA) carbon steel and the insert assemblies 144, 344 are formed of a relatively stiff stainless steel. Additionally, the use of a carbon steel for the body portions 150, 350 will reduce costs associated with applying coatings to stainless steel gasket layers. The use of a stiffer insert assembly 144, 344, as compared to the stiffness of bead portions of gasket 20, will provide higher sealing pressures and greater recovery.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A MLS gasket comprising:
   a metal body portion having an external periphery, an upper body surface, and a lower body surface, wherein said upper body surface and said lower body surface generally define a body thickness of said metal body portion therebetween;
   at least one cylinder aperture formed in said metal body portion and defined by an inner aperture surface;
   a combustion seal insert including a first insert layer having an outer first periphery, a top first insert surface and a bottom first insert surface, wherein said outer first periphery is circumscribed by said inner aperture surface, and said first insert layer includes a first insert bead portion; and
   a first sealing layer having a top first sealing surface and a bottom first sealing surface, wherein portions of said bottom first sealing surface are selectively in contact with each of said upper body surface and said top first insert surface, and compression of said first insert bead portion is selectively limited by said body portion;
   a second sealing layer having a top second sealing surface and a bottom second sealing surface, wherein portions of said top second sealing surface are selectively in contact with each of said lower body surface and a bottom second insert surface, and wherein said second sealing layer includes a second bead portion;
   wherein said combustion seal insert comprises a second insert layer, said second insert layer having an outer second periphery, a top second insert surface and said bottom second insert surface, wherein said outer second periphery is circumscribed by said inner aperture surface, said second insert layer includes a second insert bead portion, and compression of said second insert bead portion is selectively limited by said body portion; and
   wherein said body portion is thicker than the combined thickness of outer edges of said insert layers, said insert layers located side-by-side one another.

2. The gasket of claim 1, wherein the combined maximum thicknesses of said first insert layer and said second insert layer is less than the body thickness.

3. The gasket of claim 1, wherein an average stiffness of said insert is less than an average stiffness of said body portion.

4. The gasket of claim 1, wherein said first sealing layer includes a first bead portion and wherein said first bead portion, said first insert bead portion and said second insert bead portion are generally axially aligned parallel to an axis of said cylinder aperture.

5. The gasket of claim 1, wherein said body portion forms the only stopper for said first insert bead portion.

6. A MLS gasket comprising:
   a metal body portion having an external periphery, an upper body surface generally defining a first plane, and a lower body surface generally defining a second plane, wherein said upper body surface and said lower body surface define a body thickness of said metal body portion therebetween;
   at least one cylinder aperture formed in said metal body portion and defined by an inner aperture surface;
   a first sealing layer having a top first sealing surface and a bottom first sealing surface, wherein portions of said bottom first sealing surface are selectively in contact with each of said upper body surface and a top first insert surface;

a second sealing layer having a top second sealing surface and a bottom second sealing surface, wherein portions of said top second sealing surface are selectively in contact with each of said lower body surface and a bottom second insert surface, and wherein said second sealing layer includes a second bead portion;

a combustion seal insert including a first insert layer and a second insert layer, wherein said first insert layer includes an outer periphery, a top seal surface and a bottom seal surface, wherein said outer periphery is circumscribed by said inner aperture surface, and said first insert layer includes a first insert bead portion, wherein said second insert layer includes an outer periphery, a top seal surface and a bottom seal surface, wherein said outer periphery is circumscribed by said inner aperture surface, said second insert layer includes a second bead portion, and compression of said first insert bead portion and said second insert bead portion is selectively limited by said body portion;

wherein said body portion is thicker than the combined thickness of outer edges of said insert layers, said insert layers located side-by-side one another.

7. The gasket of claim 6, wherein said first insert bead portion and said second insert bead portion are generally axially aligned generally perpendicular to said first plane.

8. The gasket of claim 6, further comprising a contoured tab defined, at least in part, by the first external periphery, wherein the radial thickness of the first insert layer, measured generally parallel to the first plane, is greater at portions of the first insert layer that include the contoured tab than at portions of the first insert layer that do not include the contoured tab.

* * * * *